(12) United States Patent
Zhang et al.

(10) Patent No.: US 9,800,796 B1
(45) Date of Patent: Oct. 24, 2017

(54) APPARATUS AND METHOD FOR LOW DYNAMIC RANGE AND HIGH DYNAMIC RANGE IMAGE ALIGNMENT

(71) Applicant: OMNIVISION TECHNOLOGIES, INC., Santa Clara, CA (US)

(72) Inventors: Wenchao Zhang, Bishan (SG); Timofey Uvarov, Milpitas, CA (US); Sarvesh Swami, San Jose, CA (US); Willie Teck Tian Png, Jurong East (SG); Donghui Wu, San Mateo, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/174,819

(22) Filed: Jun. 6, 2016

(51) Int. Cl.
*H04N 5/235* (2006.01)
*H04N 5/225* (2006.01)
*H04N 5/378* (2011.01)
*G06T 7/00* (2017.01)
*G06K 9/46* (2006.01)
*G06T 7/60* (2017.01)
*G06K 9/52* (2006.01)

(52) U.S. Cl.
CPC ......... *H04N 5/2355* (2013.01); *G06K 9/4604* (2013.01); *G06K 9/4661* (2013.01); *G06K 9/52* (2013.01); *G06T 7/0085* (2013.01); *G06T 7/60* (2013.01); *H04N 5/2253* (2013.01); *H04N 5/378* (2013.01)

(58) Field of Classification Search
CPC .... H04N 5/2355; H04N 5/2253; H04N 5/378; G06K 9/52; G06K 9/4604; G06K 9/4661; G06T 7/60; G06T 7/0085
See application file for complete search history.

(56) References Cited

U.S. PATENT DOCUMENTS

| | | | | |
|---|---|---|---|---|
| 2008/0175496 | A1* | 7/2008 | Segall | H04N 5/2355 382/238 |
| 2012/0248944 | A1* | 10/2012 | Park | H03H 9/177 310/364 |
| 2012/0320236 | A1* | 12/2012 | Toyoda | H04N 5/23277 348/231.99 |

OTHER PUBLICATIONS

U.S. Appl. No. 15/064,546, filed Mar. 8, 2016, Uvarov et al.

\* cited by examiner

*Primary Examiner* — Gevell Selby
(74) *Attorney, Agent, or Firm* — Christensen O'Connor Johnson Kindness PLLC

(57) ABSTRACT

An imaging system includes an image sensor to capture a sequence of images, including a low dynamic range (LDR) image and a high dynamic range (HDR) image, and a processor coupled to the image sensor to receive the LDR image and the HDR image. The processor receives instructions to perform operations to segment the LDR image and HDR image into a plurality of segments. The processor also scans the plurality of LDR and HDR image segments to find a first image segment in the plurality of LDR image segments and a second image segment in the plurality of HDR image segments. The processor then finds interest points in the first and second image segments, and determines an alignment parameter based on matched interest points. The LDR image and the HDR image are combined in accordance with the alignment parameter.

20 Claims, 8 Drawing Sheets

(1) FIND INTEREST POINTS IN SEGMENTS (2) MATCH INTEREST POINTS IN LDR IMAGE WITH INTEREST POINTS IN HDR IMAGE USING COSINE SIMILARITY METHOD

APPARATUS AND METHOD FOR LOW DYNAMIC RANGE AND HIGH DYNAMIC RANGE IMAGE ALIGNMENT

TECHNICAL FIELD

This disclosure relates generally to image sensor operation and in particular but not exclusively, relates to high dynamic range imaging.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

High dynamic range (HDR) refers to techniques used to expand the range of luminosity in cameras/image sensors. One goal is to have the camera capture a similar rage of luminance as the human eye typically sees. HDR cameras can display a greater range of luminance levels than cameras using more traditional methods. This is most evident in photography of image scenes containing very bright light contrasted with extreme shade or darkness.

However, despite the advent of HDR imaging, there is still room for improvement in the image sensor field. Higher resolution HDR images are desirable in many applications. Advances in image sensor technologies allow for other technological spaces to grow in parallel (e.g., self-driving cars which are reliant on the quality of images received to make informed driving decisions).

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
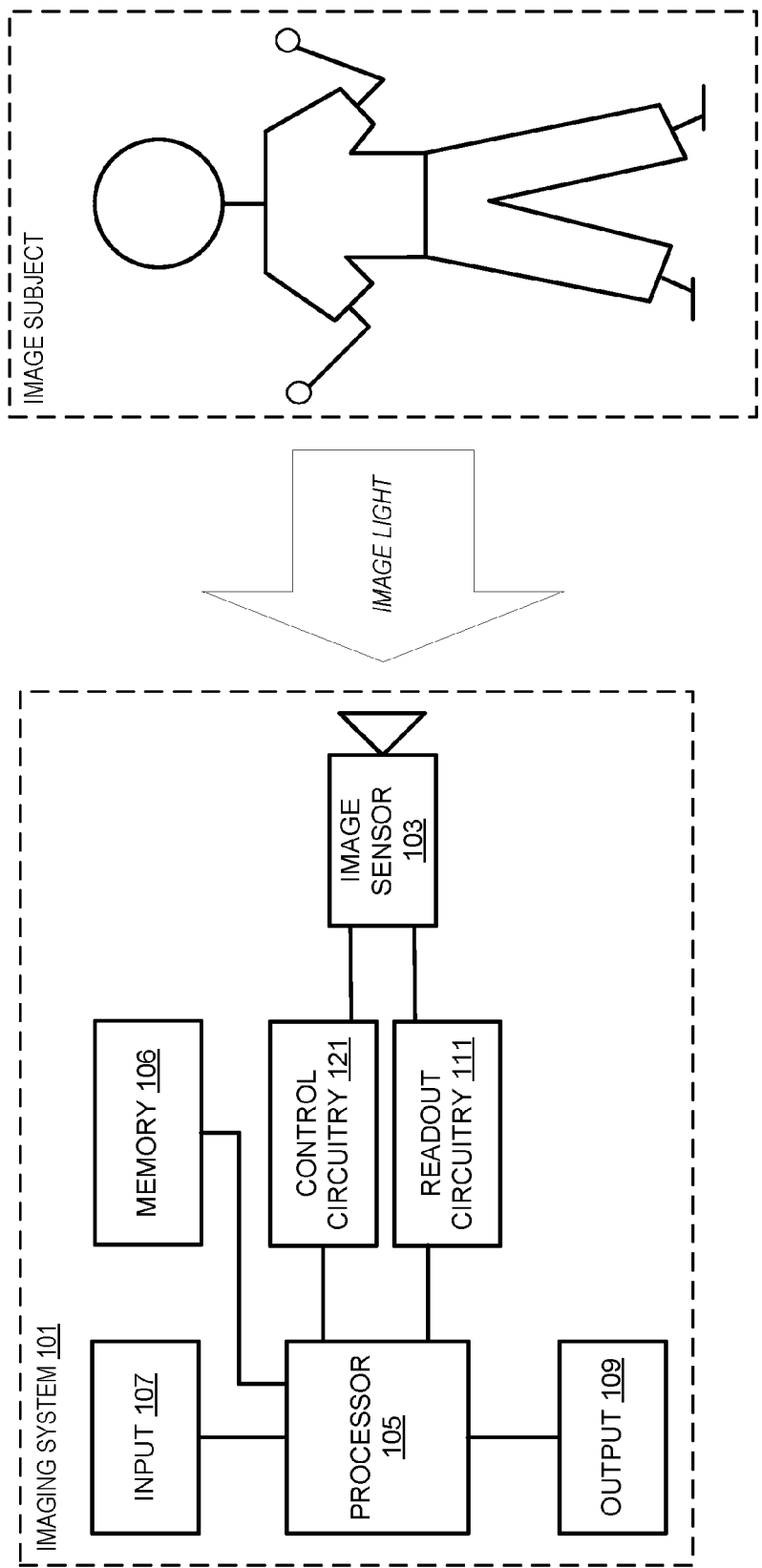
FIG. 1 depicts an example imaging system, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for image alignment are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It is worth noting that specific elements of circuitry/logic may be substituted for logically equivalent or analogous circuitry and may be implemented in both software and hardware systems.

In some imaging situations, it may be useful to combine low dynamic range images (LDR) images and high dynamic range (HDR) images in order to create a hybrid image with all the mid-range detail of an LDR image, and the breadth of exposure of an HDR image. However, alignment of these two images may prove difficult. Accordingly, the disclosure herein provides a system and method for the accurate alignment of LDR images and HDR images prior to forming a composite LDR/HDR image.

FIG. 1 depicts an example imaging system 101. Imaging system 101 includes: image sensor 103, processor 105, memory 106 (e.g., RAM, ROM, storage, etc.), input 107, output 109, readout circuitry 111, and control circuitry 121. Image sensor 103 is configured to capture a sequence of images including at least one low dynamic range (LDR) image and at least one high dynamic range (HDR) image. In the depicted example, this may be at least one HDR image and at least one LDR image of the image subject (i.e., the person). Control circuitry 121 is coupled to image sensor 103 to control LDR image capture and HDR image capture, and readout circuitry 111 is coupled to read out image data (e.g., image data corresponding to the LDR and HDR images) captured by image sensor 103. Processor 105 is coupled to readout circuitry 111 to receive image data corresponding to the at least one LDR image, and image data corresponding to the at least one HDR image. In one example, as will be discussed in connection with FIG. 3, processor 105 is coupled to receive instructions from memory 106, configured to receive the LDR and HDR images, and perform alignment operations on the LDR and HDR images.

Figure 2:
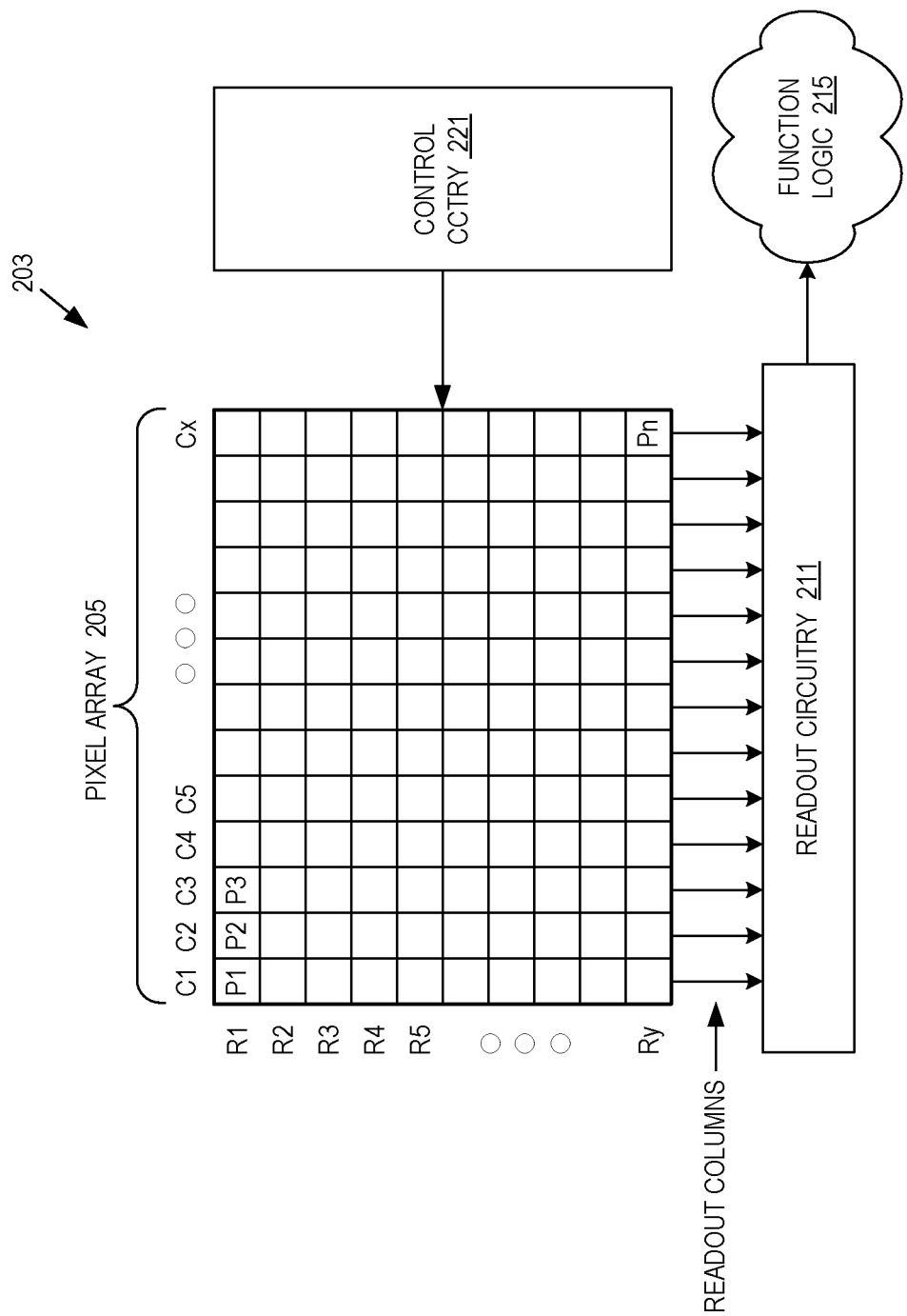
FIG. 2 illustrates an example image sensor, in accordance with the teachings of the present invention.

FIG. 2 illustrates an example image sensor 203 (e.g., image sensor 103 of FIG. 1). Image sensor 203 includes pixel array 205, control circuitry 221, readout circuitry 211, and function logic 215. In one example, pixel array 205 is a two-dimensional (2D) array of photodiodes, or image sensor pixels (e.g., pixels P1, P2 . . . , Pn).

In one example, image sensor 203 may be a general purpose image sensor coupled to a processor running software, which allows image sensor 203 to capture both LDR and HDR images. For example, in order to detect bright portions of a scene, the software could reduce the integration period of the pixels in image sensor 203. To detect very dark portions of a scene, the software could increase the integration time of the individual pixels allowing more light to be collected. Alternatively, image sensor 203 may be an image sensor specifically designed to capture both LDR and HDR images. For example, image sensor 203 may include a color filter array including specialty color filters with varying extinction coefficients. This may allow image sensor 203 to clearly image scenes with very bright and very dark components. However, one of ordinary skill in the art will appreciate that the examples listed above are not exhaustive and that any image sensor 203 capable of capturing both LDR and HDR images may be used, in accordance with the teachings of the present disclosure.

As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. In one example, after each image sensor photodiode/pixel in pixel array 205 has acquired its image data or image charge, the image data is readout by readout circuitry 211 and then transferred to function logic 215. Readout circuitry 211 may be coupled to readout image data from the plurality of photodiodes in pixel array 205. In various examples, readout circuitry 211 may include amplification circuitry, analog-to-digital (ADC) conversion circuitry, or otherwise. Function logic 215 may simply store the image data or even manipulate the image data by applying post image effects. In one example, function logic 215 may be contained in the processor (e.g., processor 105).

In one example, control circuitry 221 is coupled to pixel array 205 to control operation of the plurality of photodiodes in pixel array 205. For example, control circuitry 221 may generate a shutter signal for controlling image acquisition. In one example, the shutter signal is a global shutter signal for simultaneously enabling all pixels within pixel array 205 to simultaneously capture their respective image data during a single acquisition window. In another example, image acquisition is synchronized with lighting effects such as a flash.

In one example, image sensor 203 may be included in a digital camera, cell phone, laptop computer, or the like. Additionally, image sensor 203 may be coupled to other pieces of hardware such as a processor (e.g., processor 105), memory elements, lighting/flash, and/or display. Other pieces of hardware may deliver instructions to image sensor 203, extract image data from image sensor 203, manipulate image data supplied by image sensor 203, or reset image data in image sensor 203.

Figure 3:
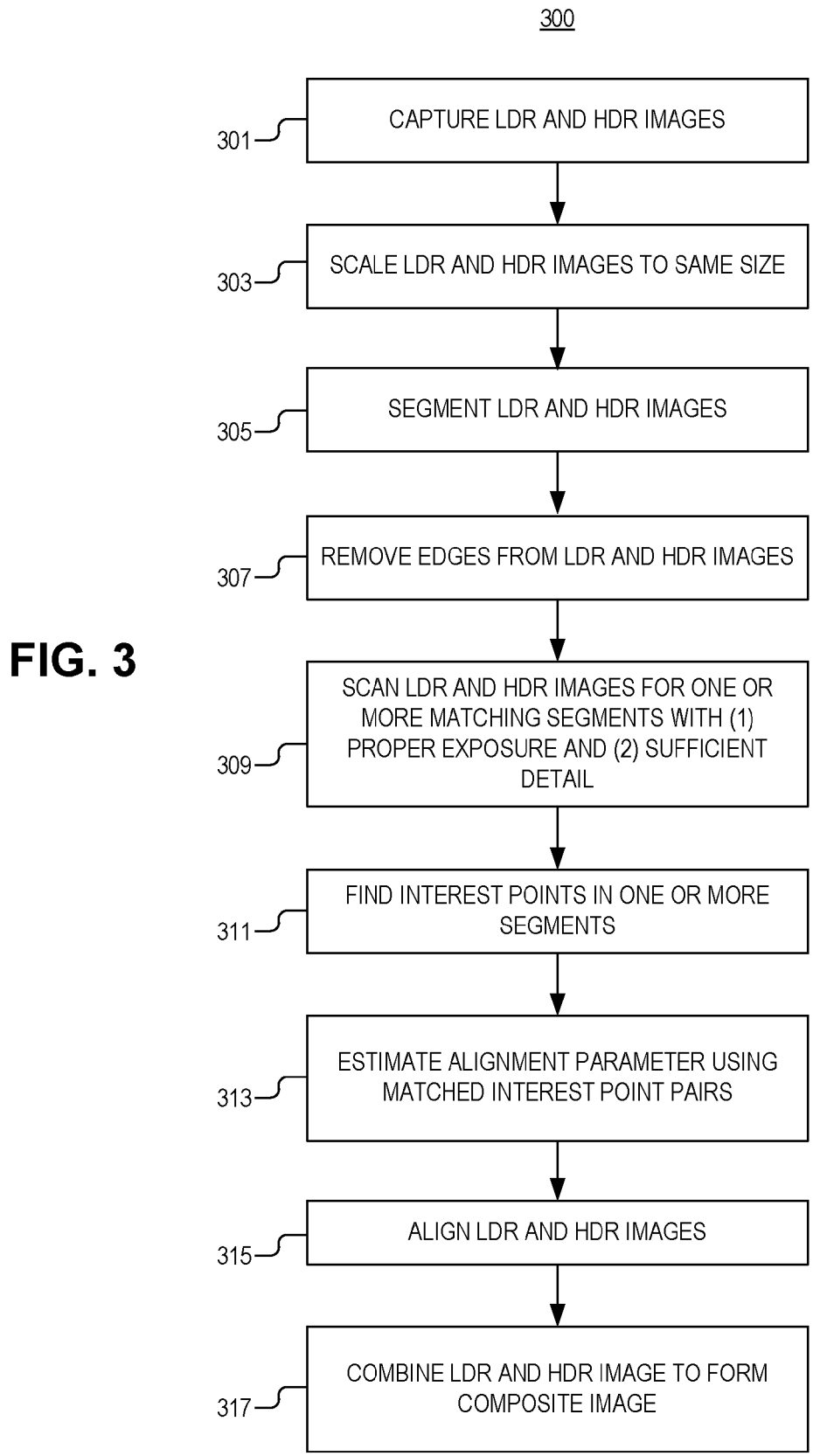
FIG. 3 depicts an example method of imaging system operation, in accordance with the teachings of the present invention.

FIG. 3 depicts an example method 300 of imaging system operation. In one example, method 300 may be performed by an imaging system (such as imaging system 100 of FIG. 1), in which a processor is configured to receive instructions, which when executed perform the method blocks of method 300. The order in which some or all of the method blocks appear should not be deemed limiting. Rather, one of ordinary skill in the art having the benefit of the present disclosure will understand that some of the method blocks may be executed in a variety of orders not illustrated, or even in parallel. Additionally, blocks may be added to, or removed from, method 300, in accordance with embodiments of the disclosure.

Block 301 illustrates capturing at least one LDR image and at least one HDR image. In some examples, more than one LDR and/or more than one HDR image may be captured and used to form the composite LDR/HDR image. In these examples, method 300 may be repeated several times to determine alignment parameters for the multiple LDR/HDR images.

Block 303 depicts scaling the LDR and HDR images to the same size. As stated above, the image sensor (e.g., image sensor 103/203) may be a general purpose image sensor or may be a specialized image sensor. In some instances, in order to capture both LDR and HDR images, the images captured have different resolutions (e.g., a first subset of pixels in a pixel array may be used to capture an HDR image, while a second subset of pixels in a pixel array may be used to capture an LDR image, and the first and second subsets include a different number of pixels). Accordingly, the images may need to be scaled to the same size in order to create a composite image from the LDR and HDR images.

Block 305 depicts segmenting the LDR image into a plurality of LDR image segments, and segmenting the HDR image into a plurality of HDR image segments. If the images are square, the LDR and HDR images may be segmented into X number of segments with dimensions N×N (N segments on the x-axis, and N segments on the y-axis). Alternatively, if the images are rectangular, the LDR and HDR images may be segmented into X number of segments with dimensions M×N (M segments on the x-axis, and N segments on the y-axis).

Block 307 shows removing edges from the LDR and HDR images. In many examples "removing edges" simply refers to not considering edges during the scanning process (see infra discussion of block 309). Actual cropping of the images may require additional time and memory. However, for ease of explanation, both actually removing the edges from the image (cropping the images) and removing edges from scanning consideration will be referred to as "removing edges".

In one example, edge removal occurs prior to scanning the plurality of LDR image segments and the plurality of HDR image segments. Edge removal (or non-consideration) may be useful because in some situations, image edges suffer from distortion due to image sensor hardware limitations. By removing distorted edges, it may be possible to align the LDR and HDR images with a higher degree of accuracy. In one example, 10% of the LDR and/or HDR images are removed; however, in other examples anywhere from 1-30% of the images may be removed. In some examples, it may be advantageous to segment the image prior to removing the edges, as one or more row/column of segments may be removed from each edge of the image (see infra FIG. 4B).

Block 309 illustrates scanning the segmented LDR and HDR images for one or more matching segments (i.e., segments in the LDR and HDR images that contain the same portion of the image), and selecting one or more matching segments for use in image alignment.

Segments in each image are chosen based on two criteria (1) proper exposure, and (2) sufficient detail. In one example, proper exposure means that the average luminance/brightness of the segments is close to the middle of the luminance/brightness range of the image sensor. Thus, the image segments are not too dark and not too bright. Sufficient detail may mean that there is a threshold level of image detail in the segments. This threshold level of detail may be quantified using several techniques. For example, a threshold level of detail may be selected for by choosing an image segment that has a wide range of luminance values (while the average luminance value of the segment is still close to mid-range). A segment with a wide range of luminance values may have many contrast points and distinct pixel groupings, allowing for accurate image alignment.

In one example the plurality of LDR image segments disposed proximate to edges of the LDR image are scanned before the plurality of LDR image segments disposed proximate to a center of the LDR image are scanned. In the same or a different example, the plurality of HDR image segments disposed proximate to edges of the HDR image are scanned before the plurality of HDR image segments disposed proximate to a center of the HDR image are scanned. Preferentially scanning/selecting segments near the edges of the LDR and HDR images may give a better indication of the true rotational difference between the LDR and HDR images (since rotational differences are exaggerated near the image edges).

Block 311 illustrates selecting interest points in the one or more segments. An interest point may be, for example, a cluster of several distinct pixels existing in both the LDR image and the HDR image which make for a good reference point. In one example, where the LDR and HDR image include a square object, an interest point may be a corner of the square object. By matching interest points, the translational/rotational differences between the two images can be easily determined.

It is worth noting, that only finding interest points in the one or more segments decreases search time/processing power, since the processor only has to scan a few small areas of the LDR and HDR images to obtain interest points. Furthermore, the search criteria for selecting image segments (properly exposed with sufficient detail) ensure that there will be quality interest points in the selected segments. This allows for more accurate alignment of the LDR and HDR images.

Interest points are then matched in the LDR and HDR images. In one example, a cosine similarity method (rather than a method using Euclidean distance) is used to match interest points in the LDR image with corresponding interest points in the HDR image. However, in another example, a method using Euclidean distance is employed. Furthermore, in some examples, the resolution of LDR/HDR segments may be reduced to increase the speed of interest point matching.

In one example, the matched interest points that have a distance between them that is ≥3σ larger than other interest point pairs may be removed. This may help eliminate falsely matched interest points. For example, once the processor matches the interest points in the LDR image with the corresponding interest points in the HDR image, the processor removes matched points if the distance between the matched points is 2σ-3σ larger than the average distance between matched points. Points with 2σ or more deviation may have a higher probability of being false matches.

Block 313 shows estimating an alignment parameter using the matched interest points. In one example, the alignment parameter includes a rotational component and a translational component. Accordingly, once the alignment parameter is computed, the processor knows how much to shift and rotate the LDR/HDR images in order to align them.

In one example, the alignment parameter is determined using a random sample consensus (RANSAC) method. RANSAC is an iterative method to approximate parameters of a mathematical model from a data set (which may contain outliners). Here, the data set is the distance between matched interest points in the LDR image and HDR image, and degrees (rotation) between interest points in the LDR image and HDR image. RANSAC may be used to find the optimal translation distance and rotational component to align the LDR and HDR images. However, one skilled in the art will appreciate that other methods, iterative or otherwise, may be used to find a best fit line to establish an alignment parameter for LDR/HDR image alignment.

Block 315 illustrates using the alignment parameter to align the LDR and HDR images. In some examples, once the LDR and HDR images are aligned, the processor may check the alignment, or may ask for user input to ensure that the alignment is acceptable.

Block 317 shows combining the LDR and HDR images. Combining the LDR and HDR images may be achieved a number of different ways depending on which parts of each image are used in the composite image. In one example, portions of the LDR image that are poorly exposed are removed from the LDR image and replaced with the same portions of the HDR image.

One skilled in the art will appreciate that although all operations in the method described above were performed on the same LDR and HDR images, in other examples, different instances of the LDR and HDR images may be used in each of the blocks. For example, the method may use the same LDR and HDR images for blocks 301-315 to obtain the alignment parameter, but may use unaltered instances of the LDR and HDR images to form the composite image. By using the unaltered LDR and HDR images, it may be possible to avoid unnecessary image processing steps that—while useful for obtaining the alignment parameter—may hurt the quality/resolution of the combined image.

FIGS. 4A-4E each illustrate one or more of the method blocks in method 300 of FIG. 3. It is worth noting that only some of the method blocks have been illustrated in order to avoid obscuring certain aspects of the disclosure.

Figure 4A:
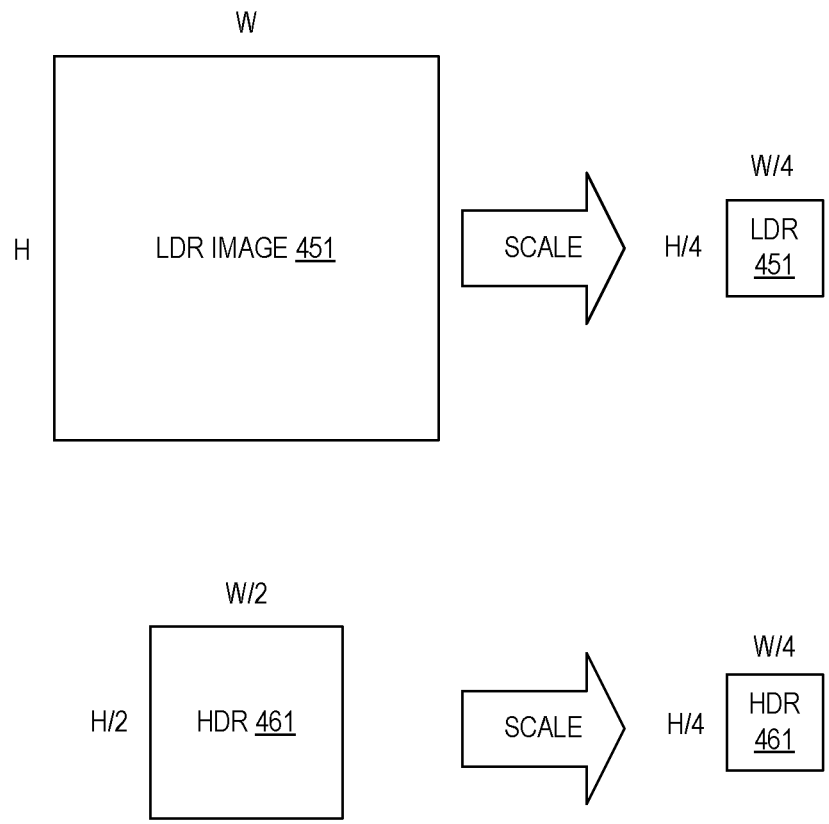
FIG. 4A depicts a portion of the method of FIG. 3, in accordance with the teachings of the present invention.

FIG. 4A depicts a portion of the method of FIG. 3, more specifically FIG. 4A shows scaling LDR image 451 and HDR image 461 to the same size (see e.g., block 303, FIG. 3). As depicted, the width of HDR image 461 is ½ the width of LDR image 451, and the height of HDR image 451 is ½ the height of LDR image 461. Both LDR image 451 and HDR image 461 are scaled so that the width and height of HDR image 461 and the width and height of LDR image 451 are ¼$^{th}$ an original width and height of LDR image 451. However, one skilled in the art will appreciate that LDR image 451 and HDR image 461 may be scaled to any size depending on the specific image processor used and the alignment methods employed.

Figure 4B:
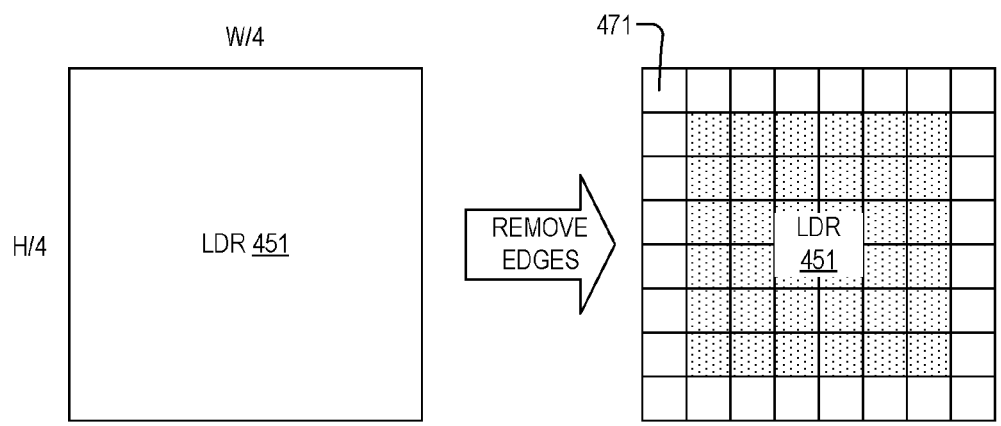
FIG. 4B depicts a portion of the method of FIG. 3, in accordance with the teachings of the present invention.
Figure 4B:
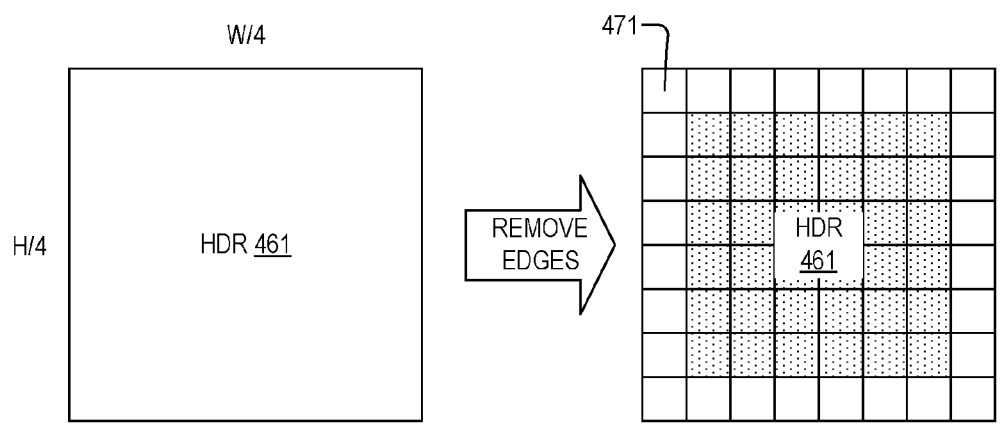

FIG. 4B depicts a portion of the method of FIG. 3, more specifically FIG. 4B shows segmenting LDR image 451 and HDR image 461 (see e.g., block 305, FIG. 3) and removing edges 471 (see e.g., block 307, FIG. 3). As shown, LDR image 451 and HDR image 461 are segmented (i.e., subdivided). In the depicted example, the images are segmented into 64 segments (8×8); however, this illustration is highly simplified as real high-resolution images may be segmented into hundreds or thousands of segments, depending on image resolution and available processing power. Furthermore, the images do not necessarily have to be subdivided into square segments; segments may take other shapes such as rectangles or other polygons. Segmenting the images allows the processor to quickly examine portions of the image to determine the quality of interest points contained within each segment. However, prior to performing any substantive analysis of the individual subdivisions, it may be advantageous to remove edges 471 from the images. As discussed above, this may include either actually removing the edges, or simply not considering the edges in subsequent scanning processes. Limitations of the physical hardware components in the image sensor may result in image edge distortion that could reduce the accuracy of the final alignment parameter. For example, image sensor devices tend to be planar, while the lens systems used to focus light on the image sensor tend to be elliptical. Accordingly, light shining through a curved lens systems and incident on the image sensor may be distorted near the edges of the image sensor due to the curvature of the lens and the planar nature of the image sensor. In this situation, removing (or not considering) image edges is advantageous for alignment.

Figure 4C:
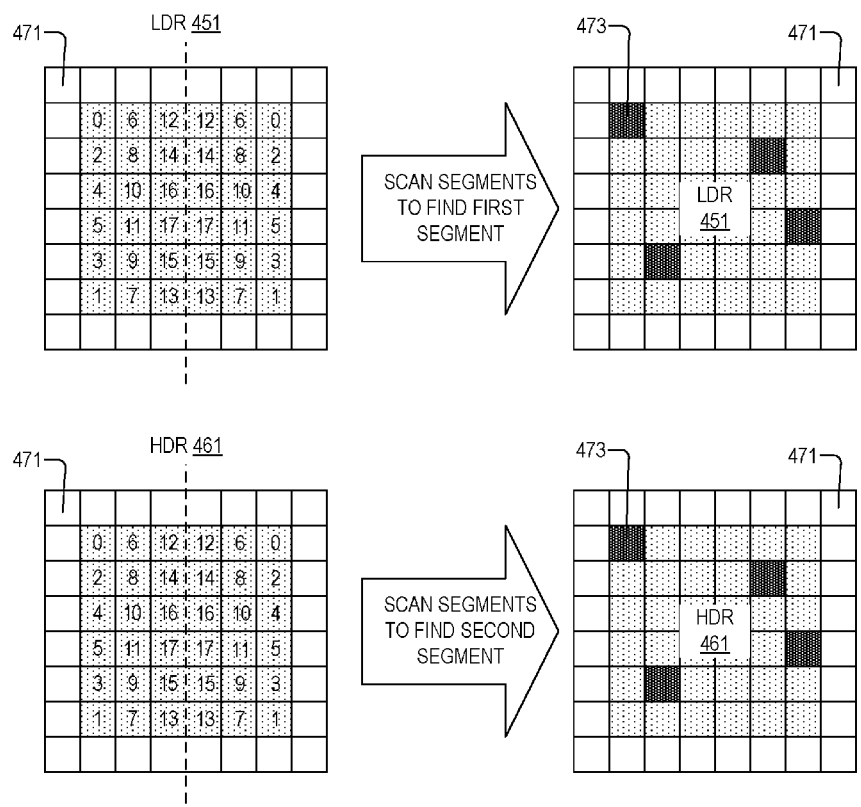
FIG. 4C depicts a portion of the method of FIG. 3, in accordance with the teachings of the present invention.

FIG. 4C depicts a portion of the example method of FIG. 3, more specifically FIG. 4C shows scanning the LDR and HDR images 451/461 for one or more matching segments with (1) proper exposure and (2) sufficient detail. In one example, segments that are properly exposed may be found by taking the norm of the luminance value of a segment in the LDR image 451 and the corresponding segment in the HDR image 461. If the norm of the two segments is close to the middle of the luminance range, then the blocks are likely well exposed. In one example, computing the norm of an LDR segment and a corresponding HDR segment may be governed by the following equation: Norm= $|S_{(LDR\ SEGMENT)} - S_{(LUMINANCE\ MID)}| + |S_{(HDR\ SEGMENT)} - S_{(LUMINANCE\ MID)}|$, where $S_{(LDR\ SEGMENT)}$ is the average luminance value of an LDR image segment, $S_{(HDR\ SEGMENT)}$ is the average luminance value of the corresponding HDR image segment, and $S_{(LUMINANCE\ MID)}$ is the middle value in the luminance range of the image sensor (e.g., if the luminance range is 0-200 the middle value is 100). Segments with a norm approaching the middle luminance value are preferentially chosen since these segments are likely well-exposed.

Information about detail may be obtained by looking at the variance of luminance in the segments. If the variance of luminance values in the segments is large, it is likely that the segments contain a threshold amount of detail (lots of light/dark contrast) and therefore a large number of interest points (e.g., unique and identifiable pixel groupings).

As discussed above, in some situations it is advantageous to scan the plurality of LDR image segments disposed proximate to edges 471 of LDR image 451 before scanning the plurality of LDR image segments disposed proximate to the center of LDR image 451. Similarly, it may be advantageous to scan the plurality of HDR image segments disposed proximate to edges 471 of HDR image 461 before scanning the plurality of HDR image segments disposed proximate to the center of HDR image 461. One possible scan order is depicted in FIG. 4C by the numbering of the segments in LDR image 451, and numbering of segments in HDR image 461. In the depicted example, LDR image 451 and HDR image 461 are divided in half, and each image half is separately scanned to find two segments in each half image. Dividing the image in half and scanning each half separately may be useful to reduce processing time if the processor is a multi-core processor which can parallelize the scanning process. The processor may scan the image halves by starting in a corner of the cropped image (segment 0) and then moving to another corner (segment 1). The processor may then scan inward from the outer corners, but still preferentially remain on the periphery of the image (segment 2 is scanned, segment 3 is scanned, etc.). If there are no viable segments proximate to edges 471 of the image, then the processor may scan segments closer toward the center of the image.

The processor may then select several segments on each image half. In the depicted example, four segments (two on each side of the image) were selected in LDR image 451 and HDR image 461 (see shaded segments 473). In one example, two segments are selected on the right side of LDR image 451 and the same two segments are selected on the right side of HDR image 461. In the same example, two segments are selected on the left side of LDR image 451 and the same two segments are selected on the left side of HDR image 451. However, any number of segments may be selected depending on the processor employed, the desired accuracy of alignment, and the required processing speed.

Figure 4D:
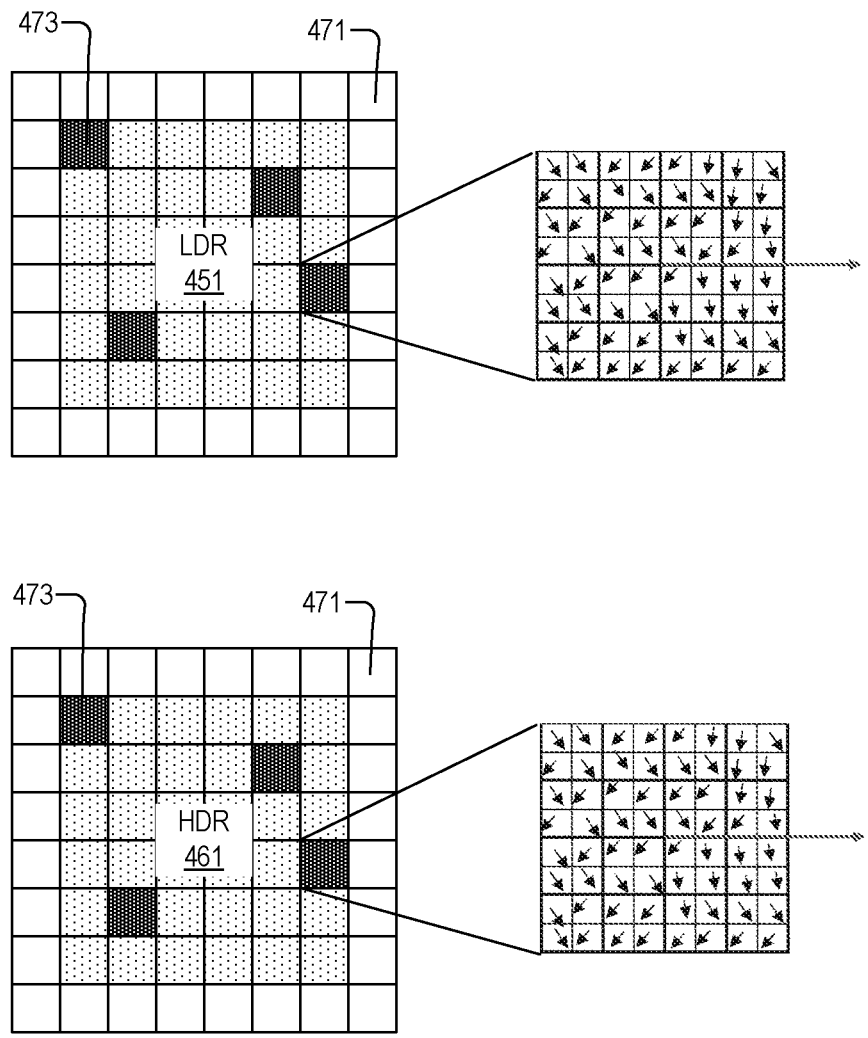
FIG. 4D depicts a portion of the method of FIG. 3, in accordance with the teachings of the present invention.

FIG. 4D depicts a portion of the example method of FIG. 3, more specifically FIG. 4D shows finding interest points in the selected segments and matching interest points in LDR image 451 with interest points in HDR image 461 (see e.g., block 311, FIG. 3). Interest points may be highly identifiable groupings of image pixels which can be used to align LDR image 541 and HDR image 461. By selecting properly resolved image segments (with a threshold amount of detail) the area the processor needs to search to find interest points is drastically reduced, cutting down both processing power and time.

In the depicted example, a cosine similarity method is used to match interest points in LDR image 451 with corresponding interest points in HDR image 461. In another example, a method utilizing Euclidean distance may be used to match interest points. However, one of ordinary skill in the art will appreciate that there are a number of different computer-vison and data filtering techniques that may be employed to match interest points in LDR image 451 with interest points in HDR image 461.

As stated above, once interest points are matched, false matches may be removed. One method of removing false matches is finding the average distance between interest points and removing matched interest points that have a distance several standard deviations above the average distance.

Although not depicted, after the interest points are matched, an alignment parameter is determined. The alignment parameter may have both a translational and rotational component and may be computed via a myriad of regression analysis techniques. However, in one example the alignment parameter is computed using a RANSAC method.

After alignment of LDR image 451 and HDR image 461, a confidence value may be output. Since the content in LDR image 451 and HDR image 461 may be almost identical, the distribution of the interest points will be almost identical. With this assumption, the confidence value is defined as the Euclidean distance of the standard variances between the interest points in LDR image 451 and HDR 461. The confidence value may quantify the reliability of the output.

Figure 4E:
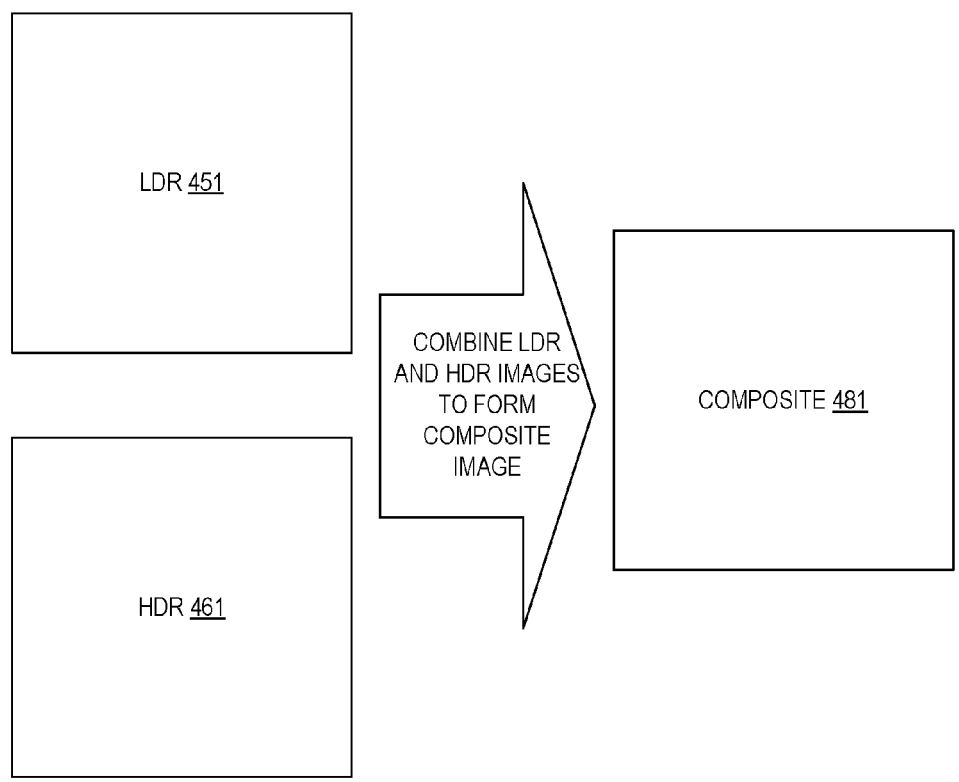
FIG. 4E depicts a portion of the method of FIG. 3, in accordance with the teachings of the present invention.

FIG. 4E depicts a portion of the example method of FIG. 3, more specifically FIG. 4E shows combining LDR image 451 and HDR image 461 to form a composite image 481. In one example, this is accomplished by replacing the portions of LDR image 451 that are over/under exposed with the same portions of HDR image 461. Alternatively, portions of HDR image 461 with midrange luminance values may be replaced with LDR image 451; thus adding high-frequency detail to HDR image 461. However, one skilled in the art will appreciate that LDR image 451 and HDR image 461 may be combined in any number of ways depending on the use case of composite image 481. For instance, a composite image 481 used for human-viewing may be formed in a very different way than a composite image 481 for applications involving machine vision (e.g., self-driving cars, drone crash avoidance, etc.).

It is worth noting that while LDR image 451 and HDR image 461 depicted in FIGS. 4A-4E are all the same instances of LDR image 451 and HDR image 461. In other examples, each step in the process may be achieved using different instances of LDR image 451 and HDR image 461. For example, the alignment parameter may be computed using one instance of LDR image 451 and HDR image 461, but composite image 481 may be formed using fresh instances of LDR image 451 and HDR image 461 (without any of the processing steps having been applied).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging system, comprising:
    an image sensor to capture a sequence of images including a low dynamic range (LDR) image and a high dynamic range (HDR) image; and
    a processor coupled to the image sensor to receive the LDR image and the HDR image, wherein the processor is coupled to receive instructions, which when executed by the processor cause the processor to perform operations including:
        segmenting the LDR image into a plurality of LDR image segments and segmenting the HDR image into a plurality of HDR image segments;
        scanning the plurality of LDR image segments and scanning the plurality of HDR image segments to find a first image segment in the plurality of LDR image segments and a second image segment in the plurality of HDR image segments, wherein the first image segment includes a portion of the LDR image and the second image segment includes a portion of the HDR image corresponding to the portion of the LDR image in the first image segment;
        finding interest points in the first image segment and the second image segment;
        determining an alignment parameter based on matched interest points in the first image segment and the second image segment; and
        combining the LDR image and the HDR image in accordance with the alignment parameter to form a composite image.

2. The imaging system of claim 1, wherein the first image segment and the second image segment are properly exposed and contain a threshold quantity of image detail.

3. The imaging system of claim 1, further comprising removing edges of the LDR image and removing edges of the HDR image prior to scanning the plurality of LDR image segments and the plurality of HDR image segments.

4. The imaging system of claim 1, further comprising scaling the LDR image and the HDR image to a same size prior to segmenting the LDR image and the HDR image.

5. The imaging system of claim 4, wherein a width of the HDR image is ½ a width of the LDR image, and a height of HDR image is ½ a height of the LDR image, and wherein the LDR image and the HDR image are scaled so that a width and height of the HDR image and a width and height of the LDR image are $\frac{1}{4}^{th}$ an original width and height of the LDR image.

6. The imaging system of claim 5, wherein the image sensor is configured to capture the HDR image with ½ the width of the LDR image and ½ the height of the LDR image.

7. The imaging system of claim 1, wherein scanning the plurality of LDR image segments includes scanning the plurality of LDR image segments disposed proximate to edges of the LDR image before scanning the plurality of LDR image segments disposed proximate to a center of the LDR image, and wherein scanning the plurality of HDR image segments includes scanning the plurality of HDR image segments disposed proximate to edges of the HDR image before scanning the plurality of HDR image segments disposed proximate to a center of the HDR image.

8. The imaging system of claim 1, wherein the interest points include distinctive portions of the LDR image and distinctive portions of the HDR image, and wherein a cosine similarity method is used to match interest points in the LDR image with corresponding interest points in the HDR image.

9. The imaging system of claim 8, wherein matched interest points that are a distance $\geq 3\sigma$, relative to an average distance between other matched interest points, from each other are removed.

10. The imaging system of claim 1, wherein the alignment parameter includes a rotational component and a translational component.

11. The imaging system of claim 10, wherein the alignment parameter is determined using a random sample consensus (RANSAC) method.

12. The imaging system of claim 1, further comprising control circuitry and readout circuitry coupled between the image sensor and the processor, wherein the readout circuitry is coupled to the image sensor to readout image data from individual pixels in the image sensor, and control circuitry is couple to control operation of the image sensor.

13. A method of image processing, comprising:
    capturing a sequence of image data with an image sensor;
    reading out the sequence of image data from the image sensor with readout circuitry coupled to the image sensor, wherein the sequence of image data includes a low dynamic range (LDR) image and a high dynamic range (HDR) image;
    receiving the sequence of image data with a processor coupled to the readout circuitry;
    segmenting, with the processor, the LDR image into a plurality of LDR image segments and segmenting the HDR image into a plurality of HDR image segments;
    scanning, with the processor, the plurality of LDR image segments and scanning the plurality of HDR image segments to find a first image segment in the plurality of LDR image segments and a second image segment in the plurality of HDR image segments, wherein the first image segment includes a portion of the LDR image and the second image segment includes a portion of the HDR image corresponding to the portion of the LDR image in the first image segment;
    finding interest points in the first image segment and the second image segment with the processor;

determining an alignment parameter with the processor based on matched interest points in the first image segment and the second image segment; and combining the LDR image and the HDR image in accordance with the alignment parameter to form a composite image.

14. The method of claim 13, wherein the first image segment and the second image segment are properly exposed and contain a threshold quantity of image detail.

15. The method of claim 13, further comprising removing edges of the LDR image and removing edges of the HDR image prior to scanning the plurality of LDR image segments and the plurality of HDR image segments.

16. The method of claim 13, further comprising scaling the LDR image and the HDR image to a same size prior to segmenting the LDR image and the HDR image.

17. The method of claim 13, wherein scanning the plurality of LDR image segments includes scanning the plurality of LDR image segments disposed proximate to edges of the LDR image before scanning the plurality of LDR image segments disposed proximate to a center of the LDR image, and wherein scanning the plurality of HDR image segments includes scanning the plurality of HDR image segments disposed proximate to edges of the HDR image before scanning the plurality of HDR image segments disposed proximate to a center of the HDR image.

18. The method of claim 13, wherein the interest points include distinctive portions of the LDR image and distinctive portions of the HDR image, and wherein a cosine similarity method is used to match interest points in the LDR image with corresponding interest points in the HDR image.

19. The method of claim 18, wherein matched interest points that are a distance $\geq 3\sigma$, relative to an average distance between other matched interest points, from each other are removed.

20. The method of claim 13, wherein the alignment parameter includes a rotational component and a translational component.

* * * * *